US011964480B2

(12) United States Patent
Toyofuku et al.

(10) Patent No.: US 11,964,480 B2
(45) Date of Patent: Apr. 23, 2024

(54) DRIVING WAVEFORM DETERMINING METHOD, NON-TRANSITORY COMPUTER-READABLE STORAGE MEDIUM STORING DRIVING WAVEFORM DETERMINING PROGRAM, LIQUID EJECTING APPARATUS, AND DRIVING WAVEFORM DETERMINING SYSTEM

(71) Applicant: Seiko Epson Corporation, Tokyo (JP)

(72) Inventors: Atsushi Toyofuku, Shiojiri (JP); Toshiro Murayama, Fujimi-machi (JP); Takahiro Katakura, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 17/387,647

(22) Filed: Jul. 28, 2021

(65) Prior Publication Data

US 2022/0032615 A1 Feb. 3, 2022

(30) Foreign Application Priority Data

Jul. 30, 2020 (JP) ................................ 2020-129293

(51) Int. Cl.
*B41J 29/38* (2006.01)
*B41J 2/045* (2006.01)

(52) U.S. Cl.
CPC ......... *B41J 2/04588* (2013.01); *B41J 2/0456* (2013.01); *B41J 2/04581* (2013.01)

(58) Field of Classification Search
CPC ... B41J 2/04588; B41J 2/04581; B41J 2/0456
See application file for complete search history.

(56) References Cited

U.S. PATENT DOCUMENTS

2014/0035992 A1* 2/2014 Paulson ............... B41J 2/04588 347/19

FOREIGN PATENT DOCUMENTS

JP 2010-131910 6/2010

* cited by examiner

*Primary Examiner* — Lam S Nguyen
(74) *Attorney, Agent, or Firm* — WORKMAN NYDEGGER

(57) ABSTRACT

A driving waveform determining method with which a waveform of a driving pulse applied to a driving element provided in a liquid ejecting head that ejects a liquid is determined includes: a first step of measuring, by performing a simulation, ejection characteristics of the liquid from the liquid ejecting head when a waveform candidate is used for the driving pulse; a second step of measuring, by performing an actual measurement, the ejection characteristics of the liquid from the liquid ejecting head when the waveform candidate is used for the driving pulse; and a third step of determining the waveform of the driving pulse in accordance with a measurement result obtained in the first step and a measurement result obtained in the second step.

10 Claims, 7 Drawing Sheets

DRIVING WAVEFORM DETERMINING METHOD, NON-TRANSITORY COMPUTER-READABLE STORAGE MEDIUM STORING DRIVING WAVEFORM DETERMINING PROGRAM, LIQUID EJECTING APPARATUS, AND DRIVING WAVEFORM DETERMINING SYSTEM

The present application is based on, and claims priority from JP Application Serial Number 2020-129293, filed Jul. 30, 2020, the disclosure of which is hereby incorporated by reference herein in its entirety.

BACKGROUND

1. Technical Field

The present disclosure relates to a driving waveform determining method, a non-transitory computer-readable storage medium storing a driving waveform determining program, a liquid ejecting apparatus, and a driving waveform determining system.

2. Related Art

In typical liquid ejecting apparatuses such as ink jet printers, liquid such as ink is ejected from a nozzle when a driving pulse is applied to a driving element such as a piezoelectric element. Here, a waveform of the driving pulse is determined so as to achieve desired ejection characteristics of the ink ejected from the nozzle.

According to the technique described in JP-A-2010-131910, a parameter for determining a driving waveform that is a waveform of a driving pulse is changed multiple times to measure ejection characteristics, and, in accordance with the measurement result, the parameter of a driving waveform that is actually used is determined.

According to the technique described in JP-A-2010-131910, since a user manually determines the driving waveform, there is a problem of an excessive burden on the user. In view of this problem, automating determination of the driving waveform through simulation or automated actual measurement is considered for reducing the burden on the user.

However, when determination of the driving waveform is automated by simply performing a simulation, it may be difficult for the driving waveform to be obtained with sufficient accuracy or difficult for the driving waveform to be determined. On the other hand, when determination of the driving waveform is automated by simply performing an automated actual measurement, an actual measurement is performed, for example, even under a condition in which an ejection abnormality occurs. Therefore, the amount of consumed ink increases unnecessarily, or time it required for recovery from, for example, a failure due to an ejection abnormality, resulting in an increase in the time required to determine the driving waveform.

SUMMARY

To address the aforementioned problem, an aspect of a driving waveform determining method of the disclosure is a driving waveform determining method with which a waveform of a driving pulse applied to a driving element provided in a liquid ejecting head that ejects a liquid is determined, and the driving waveform determining method includes: a first step of measuring, by performing a simulation, ejection characteristics of the liquid from the liquid ejecting head when a waveform candidate is used for the driving pulse; a second step of measuring, by performing an actual measurement, the ejection characteristics of the liquid from the liquid ejecting head when the waveform candidate is used for the driving pulse; and a third step of determining the waveform of the driving pulse in accordance with a measurement result obtained in the first step and a measurement result obtained in the second step.

An aspect of a non-transitory computer-readable storage medium storing a driving waveform determining program of the disclosure causes a computer to execute the driving waveform determining method according to the aspect described above.

An aspect of a liquid ejecting apparatus of the disclosure includes: a liquid ejecting head that has a driving element for ejecting a liquid; and a processing circuit that performs processing of determining a waveform of a driving pulse applied to the driving element, in which the processing circuit performs a first step of measuring, by performing a simulation, ejection characteristics of the liquid from the liquid ejecting head when a waveform candidate is used for the driving pulse; a second step of measuring, by performing an actual measurement, the ejection characteristics of the liquid from the liquid ejecting head when the waveform candidate is used for the driving pulse; and a third step of determining the waveform of the driving pulse in accordance with a measurement result obtained in the first step and a measurement result obtained in the second step.

An aspect of a driving waveform determining system of the disclosure includes: a liquid ejecting head that has a driving element for ejecting a liquid; and a processing circuit that performs processing of determining a waveform of a driving pulse applied to the driving element, in which the processing circuit performs a first step of measuring, by performing a simulation, ejection characteristics of the liquid from the liquid ejecting head when a waveform candidate is used for the driving pulse; a second step of measuring, by performing an actual measurement, the ejection characteristics of the liquid from the liquid ejecting head when the waveform candidate is used for the driving pulse; and a third step of determining the waveform of the driving pulse in accordance with a measurement result obtained in the first step and a measurement result obtained in the second step.

DESCRIPTION OF EXEMPLARY EMBODIMENTS

Figure 1:
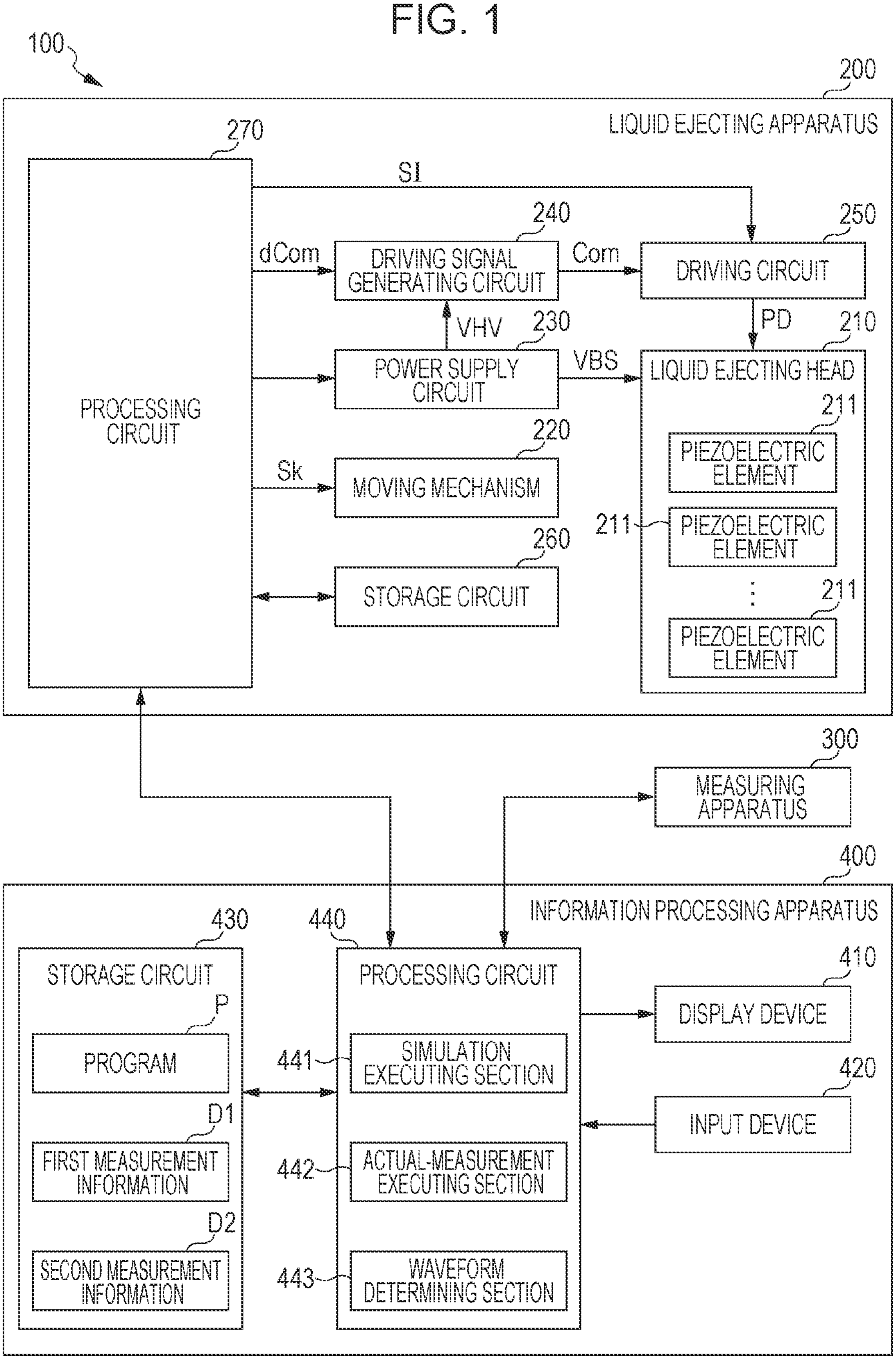
FIG. 1 is a schematic view illustrating an example of a configuration of a driving waveform determining system according to a first embodiment.

Suitable embodiments according to the disclosure will be described below with reference to the accompanying drawings. Note that, in the drawings, dimensions or scales of sections appropriately differ from actual ones, and some sections are schematically illustrated for easy understanding. The scope of the disclosure is not limited to the embodiments as long as there is no description particularly limiting the disclosure in the following description.

1. First Embodiment

1-1. Outline of Driving Waveform Determining System 100

FIG. 1 is a schematic view illustrating an example of a configuration of a driving waveform determining system 100 according to a first embodiment. The driving waveform determining system 100 automatically determines a waveform of a driving pulse PD that is used when ink, which is an example of a liquid, is ejected. More specifically, the driving waveform determining system 100 determines the driving pulse waveform by using the result obtained by measuring ejection characteristics of the ink by appropriately performing simulation and actual measurement in combination.

As illustrated in FIG. 1, the driving waveform determining system 100 includes a liquid ejecting apparatus 200, a measuring apparatus 300, and an information processing apparatus 400, which is an example of a computer. Hereinafter, these will be described sequentially with reference to FIG. 1.

1-1a. Liquid Ejecting Apparatus 200

The liquid ejecting apparatus 200 is a printer that performs printing on a printing medium by using an ink jet method. The printing medium is not particularly limited as long as it is a medium on which the liquid ejecting apparatus 200 is able to perform printing, and examples thereof include various sheets, various fabric, and various films. Note that the liquid ejecting apparatus 200 may be a printer of a serial type or a line type.

As illustrated in FIG. 1, the liquid ejecting apparatus 200 includes a liquid ejecting head 210, a moving mechanism 220, a power supply circuit 230, a driving signal generating circuit 240, a driving circuit 250, a storage circuit 260, and a processing circuit 270.

The liquid ejecting head 210 ejects the ink onto the printing medium. In FIG. 1, a plurality of piezoelectric elements 211, each of which is an example of a driving element, are illustrated as components of the liquid ejecting head 210. Although not illustrated, the liquid ejecting head 210 includes, in addition to the piezoelectric elements 211, cavities in which the ink is stored and nozzles that communicate with the cavities. Here, a piezoelectric element 211 is provided for each of the cavities, and when pressure of the cavity changes, the ink is ejected from a nozzle corresponding to the cavity. Note that, instead of the piezoelectric element 211, a heater that heats the ink in the cavity may be used as the driving element.

The number of liquid ejecting heads 210 of the liquid ejecting apparatus 200 is one in the example illustrated in FIG. 1 but may be two or more. In such a case, for example, two or more liquid ejecting heads 210 are unitized. When the liquid ejecting apparatus 200 is a serial type, the liquid ejecting head 210 or a unit that includes two or more liquid ejecting heads 210 is used such that a plurality of nozzles are distributed over a portion of the printing medium in a width direction. When the liquid ejecting apparatus 200 is a line type, a unit that includes two or more liquid ejecting heads 210 is used such that a plurality of nozzles are distributed over the entire region of the printing medium in the width direction.

The moving mechanism 220 changes relative positions of the liquid ejecting head 210 and the printing medium. More specifically, when the liquid ejecting apparatus 200 is a serial type, the moving mechanism 220 includes a transport mechanism that transports the printing medium in a given direction and a moving mechanism that iteratively moves the liquid ejecting head 210 in an axial direction orthogonal to the transport direction of the printing medium. When the liquid ejecting apparatus 200 is a line type, the moving mechanism 220 includes a transport mechanism that transports the printing medium in a direction intersecting a longitudinal direction of the unit that includes two or more liquid ejecting heads 210.

Upon receiving supply of power from a commercial power source (not illustrated), the power supply circuit 230 generates various predetermined potentials. The various potentials that are generated are supplied appropriately to the respective sections of the liquid ejecting apparatus 200. For example, the power supply circuit 230 generates a power supply potential VHV and an offset potential VBS. The offset potential VBS is supplied to the liquid ejecting head 210 and the like. The power supply potential VHV is supplied to the driving signal generating circuit 240 and the like.

The driving signal generating circuit 240 is a circuit that generates a driving signal Com for driving the respective piezoelectric elements 211 of the liquid ejecting head 210. Specifically, the driving signal generating circuit 240 includes, for example, a digital-to-analog conversion circuit and an amplification circuit. In the driving signal generating circuit 240, the digital-to-analog conversion circuit converts a waveform specification signal dCom supplied from the processing circuit 270, which will be described later, from a digital signal into an analog signal, and the amplification circuit amplifies the analog signal by using the power supply potential VHV from the power supply circuit 230, thereby generating the driving signal Com. Here, of the waveforms included in the driving signal Com, the signal of the waveform actually supplied to the piezoelectric element 211 is the driving pulse PD. Note that the driving pulse PD will be specifically described later.

The driving circuit 250 switches between supplying and not supplying, as the driving pulse PD, at least some of the waveforms included in the driving signal Com to each of the plurality of piezoelectric elements 211 in accordance with a control signal SI described later. The driving circuit 250 is an IC (integrated circuit) chip that outputs the driving signal for driving each of the piezoelectric elements 211 and a reference voltage.

The storage circuit 260 stores various programs executed by the processing circuit 270 and various kinds of data such as print data Img processed by the processing circuit 270. The storage circuit 260 includes semiconductor memory of, for example, one or both of volatile memory such as RAM (random access memory) and non-volatile memory such as ROM (read-only memory), EEPROM (electrically erasable programmable read-only memory), or PROM (programmable ROM). The print data Img is supplied from, for example, the information processing apparatus 400. Note that the storage circuit 260 may be constituted by a portion of the processing circuit 270.

The processing circuit 270 has a function of controlling the operation of the respective sections of the liquid ejecting apparatus 200 and a function of processing various kinds of data. The processing circuit 270 includes, for example, one or more processors such as a CPU (central processing unit). Note that the processing circuit 270 may include a programmable logic device such as an FPGA (field-programmable gate array) instead of or in addition to a CPU.

The processing circuit 270 controls the operation of the respective sections of the liquid ejecting apparatus 200 by executing a program stored in the storage circuit 260. Here, the processing circuit 270 generates signals such as control signals Sk and SI and the waveform specification signal dCom as signals for controlling the operation of the respective sections of the liquid ejecting apparatus 200.

The control signal Sk is a signal for controlling driving of the moving mechanism 220. The control signal SI is a signal for controlling driving of the driving circuit 250. Specifically, the control signal SI is used to specify, per predetermined unit period, whether or not the driving circuit 250 supplies, to the liquid ejecting head 210, the driving signal Com supplied from the driving signal generating circuit 240 as the driving pulse PD. Such a specification enables, for example, the amount of the ink ejected from the liquid ejecting head 210 to be specified. The waveform specification signal dCom is a digital signal for defining a waveform of the driving signal Com generated by the driving signal generating circuit 240.

1-1b. Measuring Apparatus 300

The measuring apparatus 300 is an apparatus that measures ejection characteristics of the ink ejected from the liquid ejecting head 210 when the driving pulse PD is actually used. Examples of the ejection characteristics include the ejection velocity, the amount of the ink, the number of satellites, and stability. Note that, hereinafter, the ejection characteristics of the ink ejected from the liquid ejecting head 210 may be simply referred to as "ejection characteristics".

The measuring apparatus 300 of the present embodiment is an imaging apparatus for imaging in-flight ink ejected from the liquid ejecting head 210. Specifically, the measuring apparatus 300 includes, for example, an imaging optical system and an imaging element. The imaging optical system is an optical system including at least one imaging lens and may include various optical elements, such as a prism, or may include a zoom lens, a focusing lens, or the like. The imaging element is, for example, a CCD (charge coupled device) image sensor or a CMOS (complementary MOS) image sensor. Measurement of ejection characteristics performed by the measuring apparatus 300 by using a captured image will be specifically described later.

Note that, in the present embodiment, although the measuring apparatus 300 images in-flight ink, the measuring apparatus 300 is also able to measure the ejection characteristics such as the amount of the ink ejected from the liquid ejecting head 210 in accordance with the result obtained by imaging the ink deposited on the printing medium or the like. The measuring apparatus 300 is not limited to an imaging apparatus as long as the apparatus is able to obtain the measurement result according to the ejection characteristics of the ink ejected from the liquid ejecting head 210 and may be, for example, an electronic balance that measures the mass of the ink ejected from the liquid ejecting head 210. Further, as a source of information for measuring the ejection characteristics of the ink ejected from the liquid ejecting head 210, in addition to information from the measuring apparatus 300, the result obtained by detecting a waveform of residual vibration generated by the liquid ejecting head 210 may be used. The residual vibration is vibration remaining in an ink channel of the liquid ejecting head 210 after driving of the piezoelectric element 211 and is detected as, for example, a voltage signal from the piezoelectric element 211.

1-1c. Information Processing Apparatus 400

The information processing apparatus 400 is a computer that controls the operation of the liquid ejecting apparatus 200 and the measuring apparatus 300. Here, the information processing apparatus 400 is coupled to each of the liquid ejecting apparatus 200 and the measuring apparatus 300 so as to enable wireless or wired communication. Note that such coupling may be performed via a communication network, including the Internet.

The information processing apparatus 400 of the present embodiment is an example of a computer that executes a program P, which is an example of a driving waveform determining program. The program P causes the information processing apparatus 400 to execute a driving waveform determining method for determining the waveform of the driving pulse PD applied to the piezoelectric element 211 provided in the liquid ejecting head 210 that ejects the ink, which is an example of the liquid.

As illustrated in FIG. 1, the information processing apparatus 400 includes a display device 410, which is an example of a display section, an input device 420, a storage circuit 430, and a processing circuit 440. These are coupled to each other so as to enable communication.

The display device 410 displays various images in accordance with control of the processing circuit 440. Here, the display device 410 may include various display panels, such as a liquid crystal display panel and an organic EL (electroluminescence) display panel. Note that the display device 410 may be provided outside the information processing apparatus 400 or may be a component of the liquid ejecting apparatus 200.

The input device 420 is a device that receives a user operation. For example, the input device 420 includes a pointing device, such as a touch pad, a touch panel, or a mouse. Here, when the input device 420 includes a touch panel, the input device 420 may also function as the display device 410. Note that the input device 420 may be provided outside the information processing apparatus 400 or may be a component of the liquid ejecting apparatus 200.

The storage circuit 430 is a device that stores various programs executed by the processing circuit 440 and various kinds of data processed by the processing circuit 440. The storage circuit 430 includes, for example, a hard disc drive or semiconductor memory. Note that a portion of the storage circuit 430 or the whole storage circuit 430 may be provided in a storage apparatus, a server, or the like disposed outside the information processing apparatus 400.

The program P, first measurement information D1, and second measurement information D2 are stored in the storage circuit 430 of the present embodiment. The first measurement information D1 is information of the result obtained by measuring the ejection characteristics of the ink ejected from the liquid ejecting head 210 by performing a simulation described later. The second measurement information D2 is information of the result obtained by measuring the ejection characteristics of the ink ejected from the liquid ejecting head 210 by performing an actual measurement with the measuring apparatus 300 described above. Here, the pieces of information include information indicating the measurement result and additionally include information of measurement conditions such as the waveform and temperature used for measurement. Note that some or all of the program P, the first measurement information D1, and the second measurement information D2 may be stored in a storage apparatus, a server, or the like disposed outside the information processing apparatus 400.

The processing circuit 440 is a device having a function of controlling the respective sections of the information processing apparatus 400, the liquid ejecting apparatus 200, and the measuring apparatus 300 and having a function of processing various kinds of data. The processing circuit 440 includes a processor such as a CPU (central processing unit). Note that the processing circuit 440 may be constituted by a single processor or a plurality of processors. Moreover, some or all of the functions of the processing circuit 440 may be realized by hardware such as a DSP (digital signal processor), an ASIC (application specific integrated circuit), a PLD (programmable logic device), or an FPGA (field programmable gate array).

The processing circuit 440 functions as a simulation executing section 441, an actual-measurement executing section 442, and a waveform determining section 443 by reading and executing the program P stored in the storage circuit 430. Note that although an aspect in which the simulation executing section 441, the actual-measurement executing section 442, and the waveform determining section 443 are realized by a single processing circuit 440 has been described in the present embodiment, a plurality of processing circuits 440 may be provided, and the simulation executing section 441, the actual-measurement executing section 442, and the waveform determining section 443 may be realized by individual processing circuits 440.

The simulation executing section 441 is a functional section for performing a first step and measures, by performing the simulation, the ejection characteristics of the ink ejected from the liquid ejecting head 210 when a waveform candidate of the driving pulse PD is used. The measurement result is stored in the storage circuit 430 as the first measurement information D1. The simulation is implemented by, for example, a program module that performs arithmetic operation for generating the ejection characteristics from the driving pulse PD waveform. A plurality of coefficients set experimentally in accordance with a theoretical value and the like are applied to the expression of the arithmetic operation. In the arithmetic operation, for example, when a parameter described later indicating the driving pulse PD waveform is input as an input value, a numerical value indicating the ejection characteristics such as the velocity of the ink and the amount of the ink is generated as an output value.

The actual-measurement executing section 442 is a functional section for performing a second step and measures, by performing the actual measurement with the measuring apparatus 300 described above, the ejection characteristics of the ink ejected from the liquid ejecting head 210 when a waveform candidate of the driving pulse PD is used. The measurement result is stored in the storage circuit 430 as the second measurement information D2. The actual measurement will be described in detail in "1-3. Actual measurement of ejection characteristics of ink" described later.

The waveform determining section 443 is a functional section for performing a third step and determines the driving pulse PD waveform in accordance with the measurement results of the simulation executing section 441 and the actual-measurement executing section 442. The waveform determining section 443 of the present embodiment has a function of evaluating the measurement results of the simulation executing section 441 and the actual-measurement executing section 442 and a function of determining which processing of the simulation executing section 441 and the actual-measurement executing section 442 is to be performed in accordance with the evaluation result and performing adjustment to optimize the waveform candidate used for measurement.

The waveform determining section 443 determines which processing of the simulation executing section 441 and the actual-measurement executing section 442 is to be performed in accordance with the evaluation result, and when the simulation with the simulation executing section 441 is successful, the simulation executing section 441 performs the simulation as many times as possible, and the actual-measurement executing section 442 then performs the actual measurement. Thus, the actual measurement is suppressed from being performed more than necessary or under an inappropriate condition. The waveform determining section 443 finally determines the driving pulse PD waveform that achieves desired ejection characteristics by adjusting the waveform candidate used for measurement to optimize the waveform candidate in accordance with the evaluation result. Determination of the driving pulse PD waveform will be described in detail below.

1-2. Example of Driving Pulse PD Waveform

Figure 2:
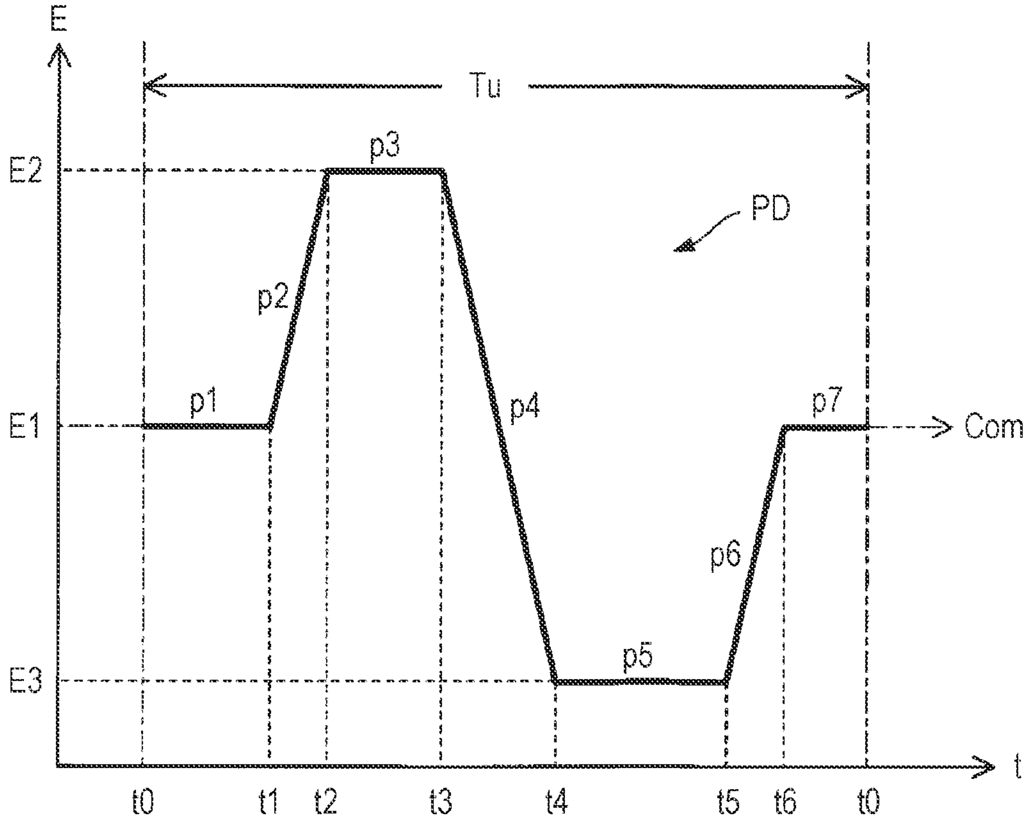
FIG. 2 illustrates an example of a driving pulse waveform.

FIG. 2 illustrates an example of the driving pulse PD waveform. FIG. 2 illustrates a change over time in potential of the driving pulse PD, that is, a voltage waveform of the driving pulse PD. Note that the driving pulse PD waveform is not limited to the example illustrated in FIG. 2 and may be any waveform.

As illustrated in FIG. 2, the driving pulse PD is included in the driving signal Com per unit period Tu. In the example illustrated in FIG. 2, a potential E of the driving pulse PD rises from a reference potential E1 to a potential E2, then drops to a potential E3 lower than the potential E1, and then returns to the potential E1.

More specifically, the potential E of the driving pulse PD is first kept at the potential E1 during a period from a timing t0 to a timing t1 and then rises to the potential E2 during a period from the timing t1 to a timing t2. The potential E of the driving pulse PD is kept at the potential E2 during a period from the timing t2 to a timing t3 and then drops to the potential E3 during a period from the timing t3 to a timing t4. Next, the potential E is kept at the potential E3 during a period from the timing t4 to a timing t5 and then rises to the potential E1 during a period from the timing t5 to a timing t6.

The driving pulse PD having such a waveform increases the capacity of a pressure chamber of the liquid ejecting head 210 during the period from the timing t1 to the timing t2 and sharply reduces the capacity of the pressure chamber during the period from the timing t3 to the timing t4. Such a change in the capacity of the pressure chamber enables some of the ink in the pressure chamber to be ejected from the nozzle as liquid droplets.

The driving pulse PD waveform as described above is able to be represented by a function that uses parameters p1, p2, p3, p4, p5, p6, and p7 corresponding to the respective periods described above. When the driving pulse PD waveform is defined by the function, by changing the respective parameters, it is possible to adjust the driving pulse PD waveform. By adjusting the driving pulse PD waveform, it is possible to adjust the ejection characteristics of the ink ejected from the liquid ejecting head 210.

1-3. Actual Measurement of Ejection Characteristics of Ink

The actual-measurement executing section 442 of the information processing apparatus 400 described above drives the liquid ejecting head 210 by actually using the driving pulse PD and measures the ejection characteristics of the ink ejected from the liquid ejecting head 210 in accordance with imaging information from the measuring apparatus 300.

Figure 3:
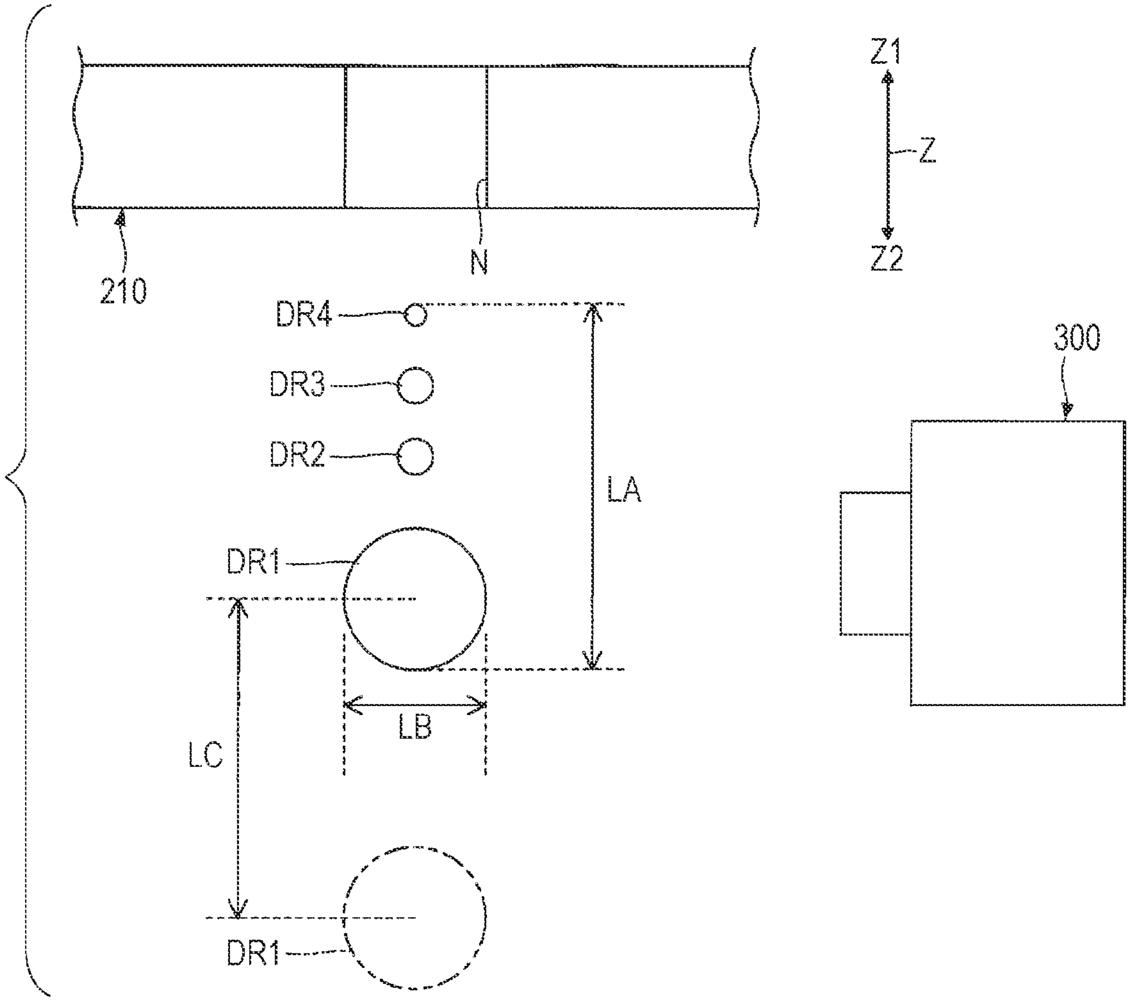
FIG. 3 is a view for explaining actual measurement of ejection characteristics of ink.

FIG. 3 is a view for explaining actual measurement of the ejection characteristics of the ink. As illustrated in FIG. 3, the measuring apparatus 300 of the present embodiment images, in a direction orthogonal to or intersecting an ejection direction, liquid droplets DR1, DR2, DR3, and DR4 of the in-flight ink ejected from a nozzle N of the liquid ejecting head 210.

The liquid droplet DR1 is a main liquid droplet. On the other hand, the respective liquid droplets DR2, DR3, and DR4 are liquid droplets called satellites a diameter of which is smaller than that of the liquid droplet DR1 and are generated following the liquid droplet DR1 in accordance with generation of the liquid droplet DR1. Note that the presence or absence of the liquid droplets DR2, DR3, and DR4, and the number, size, and the like of the liquid droplets DR2, DR3, and DR4 vary depending on the driving pulse PD waveform described above.

The ejection amount of the ink ejected from the liquid ejecting head 210 is calculated in accordance with a diameter LB of the liquid droplet DR1 by using, for example, an image captured by the measuring apparatus 300. For example, by continuously imaging the liquid droplet DR1, the ejection velocity of the ink ejected from the liquid ejecting head 210 is calculated in accordance with a distance LC, by which the liquid droplet DR1 moves in a predetermined time, and in accordance with the predetermined time. In FIG. 3, the liquid droplet DR1 after the predetermined time has elapsed is indicated by the two-dot chain line. Moreover, an aspect ratio (LA/LB) of the ink ejected from the liquid ejecting head 210 is also able to be calculated as the ejection characteristics of the ink.

1-4. Flow of Determining Driving Pulse PD Waveform

Figure 4:
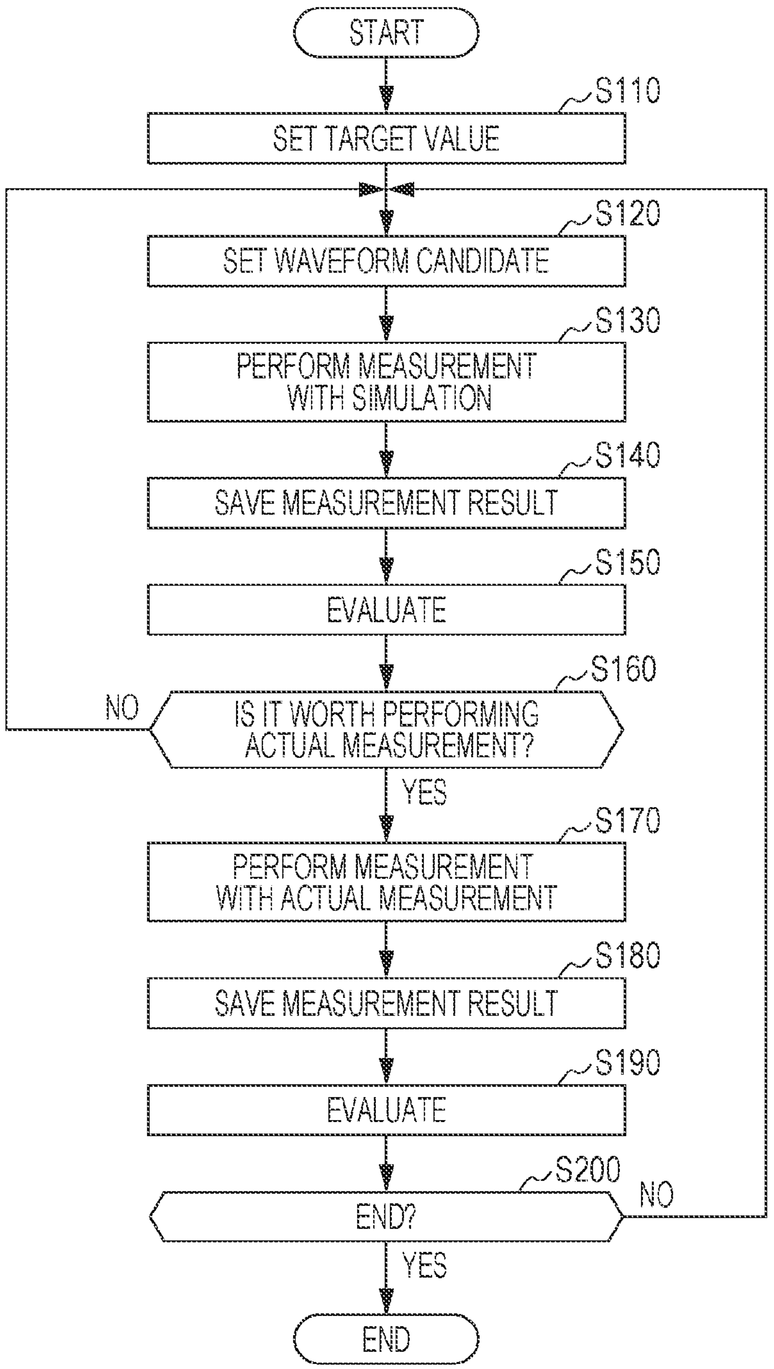
FIG. 4 is a flowchart of a driving waveform determining method according to the first embodiment.

FIG. 4 is a flowchart of a driving waveform determining method according to the first embodiment. As illustrated in FIG. 4, first, in step S110, the waveform determining section 443 sets a target value of ejection characteristics in response to, for example, an input by the user. In step S120, the waveform determining section 443 then sets a waveform candidate according to the target value or an evaluation value. Note that, in step S120, when neither evaluation value nor waveform candidate according to the evaluation value exists, the waveform candidate according to the target value is set, and alternatively, when an evaluation value or a waveform candidate according to the evaluation value exists, the waveform candidate according to the evaluation value is set. Note that the waveform candidate may be set by using another method and may be, for example, randomly generated.

Next, in step S130, the waveform determining section 443 enables the simulation executing section 441 to perform measurement by performing the simulation. In step S140, the waveform determining section 443 enables the storage circuit 430 to store the measurement result as the first measurement information D1. In step S150, the waveform determining section 443 then calculates an evaluation value of an evaluation function by using the measurement result.

Next, in step S160, the waveform determining section 443 determines whether the waveform candidate is worth performing measurement with the actual-measurement executing section 442 based on criteria described later. When it is not worth performing the measurement, the procedure returns to step S120 described above. That is, the waveform determining section 443 repeats steps S120 to S160 described above until it is determined to be worth performing the measurement.

On the other hand, when it is worth performing the measurement, the waveform determining section 443 enables the actual-measurement executing section 442 to perform measurement with the actual measurement in step S170. In step S180, the waveform determining section 443 enables the storage circuit 430 to store the measurement result as the second measurement information D2. In step S190, the waveform determining section 443 then calculates an evaluation value of an evaluation function by using the measurement result.

Next, the waveform determining section 443 determines whether or not to end the procedure in step S200.

1-5. Details of Steps

First, step S120 will be specifically described. In the driving waveform determining system 100, for determining the driving pulse PD waveform, first, an initial waveform that is a first waveform candidate is set in accordance with a target value of, for example, a value of target ejection characteristics. The initial waveform is set when the user performs an input operation via the input device 420 described above or is automatically set when the program P is executed.

Next, step S130 will be specifically described. The waveform determining section 443 enables the simulation executing section 441 to measure the ejection characteristics when the waveform candidate is used for the driving pulse PD.

Next, step S150 will be specifically described. The measurement result is evaluated by using, for example, an evaluation function that takes a minimum or maximum value when predetermined ejection characteristics have a desired value or range, and the evaluation result is represented as an evaluation value that is a calculation value of the evaluation function. A linear sum of terms regarding the predetermined ejection characteristics is used for the evaluation function. A linear sum of a term regarding the ejection velocity and a term regarding the amount of the ink is used for the evaluation function of the present embodiment. Moreover, parameters of the evaluation function are the parameters p1, p2, p3, and pn regarding the driving pulse PD waveform described above.

More specifically, an example of the evaluation function f(x) is represented by $$f(x)=W1\times(Vm(x)-\text{Vmtarget})^2+W2\times(Iw(x)-\text{Iwtarget})^2.$$

Here, in the evaluation function f(x), x is the parameter p1, p2, p3, or pn. Vm(x) is a measurement value of the ejection velocity obtained by simulation. Iw(x) is a measurement value of the amount of the ink obtained by simulation. Vmtarget is a target value of the ejection velocity. Iwtarget is a target value of the amount of the ink. W1 and W2 are each a weighting coefficient. Note that, as the example of the evaluation function f(x), evaluation is performed by using the amount of the ink and the ejection velocity but may be performed by using ejection stability, inclination in the ejection direction, and other items.

Note that the waveform candidate is adjusted such that the measurement result becomes close to the target ejection characteristics in accordance with the evaluation value of the evaluation function. The adjustment is actually reflected in the waveform candidate when it is determined in step S160 described later that the procedure returns to step S120.

The waveform candidate is adjusted by using, for example, Bayesian optimization or the Nelder-Mead method with which the evaluation value of the evaluation function according to the measured ejection characteristics is minimized.

When Bayesian optimization is used to adjust the waveform candidate, by using an acquisition function such as EI (expected improvement), PI (probability of improvement), UCB (upper confidence bound), or PES (predictive entropy search) and searching for the parameters p1, p2, p3, and pn, the waveform candidate is determined.

Here, a feature of the obtained waveform candidate varies depending on the type of the acquisition function used. In general, the waveform candidate obtained by using the acquisition function EI tends to be a waveform for which an expected value of an improvement amount is high. The waveform candidate obtained by using the acquisition function PI is a waveform for which a probability of improvement is high but an improvement amount is small. The waveform candidate obtained by using the acquisition function UCB is a waveform that enables not only great improvement but also great deterioration.

The Nelder-Mead method is a local optimization algorithm and is thus suitably used to slightly change an ink property or target ejection characteristics by using an existing waveform for the driving pulse PD.

Next, step S160 will be specifically described. The waveform determining section 443 determines whether to proceed to the processing of the actual-measurement executing section 442 after the processing of the simulation executing section 441 ends based on criteria that whether ejection is able to be normally performed without an occurrence of mixing of air bubbles or the like, that no ejection failure is caused later, and that it is worth performing the actual measurement. That is, when normal ejection is possible, when no ejection failure is caused later, and when it is worth performing the actual measurement, the waveform determining section 443 enables the actual-measurement executing section 442 to perform processing, and otherwise, the procedure returns to step S120, and the waveform determining section 443 enables the simulation executing section 441 to perform processing again by using the waveform candidate adjusted as described above as the next waveform. Although whether or not to be worth performing the actual measurement may be determined by using any method, an example of the determination method will be described below.

For example, when the amount of the ink indicated by the measurement result obtained by the simulation executing section 441 is less than a predetermined threshold, it is estimated that ejection is not able to be normally performed, it is thus determined that it is not yet worth performing the actual measurement, and the procedure returns to step S120. On the other hand, when the amount of the ink is the predetermined threshold or more, it is determined to be worth performing the actual measurement, and the procedure proceeds to step S170.

For example, a range of a waveform with which an ejection failure readily occurs or a waveform that is not practical due to a restriction according to a lifetime, safety, or the like of hardware is defined in advance by an inequality expression of the aforementioned parameters or the like, and when the waveform candidate is within the range, the waveform candidate is estimated as being not adaptive without performing the actual measurement, it is thus determined that it is not yet worth performing the actual measurement, and the procedure returns to step S120. On the other hand, when the waveform candidate is out of the range, it is determined to be worth performing the actual measurement, and the procedure proceeds to step S170.

Moreover, for example, when a difference between the ejection characteristics obtained as the measurement result from the simulation executing section 441 and a target value is a predetermined level or more, it is estimated that improvement is still possible by performing the simulation, it is thus determined that it is not yet worth performing the actual measurement, and the procedure returns to step S120. On the other hand, when the difference between the ejection characteristics and the target value is less than the predetermined level, it is determined to be worth performing the actual measurement, and the procedure proceeds to step S170.

For example, the amount of information obtained by the simulation executing section 441 and the amount of information obtained by the actual-measurement executing section 442 are evaluated, and when the amount of information obtained by the actual-measurement executing section 442 is smaller than the amount of information obtained by the simulation executing section 441 by a predetermined amount or more, it is estimated that improvement is still possible by performing the simulation, it is thus determined that it is not yet worth performing the actual measurement, and the procedure returns to step S120. On the other hand, when the amount of information obtained by the actual-measurement executing section 442 is not smaller than the amount of information obtained by the simulation executing section 441 by the predetermined amount or more, it is determined to be worth performing the actual measurement, and the procedure proceeds to step S170. Note that, the amounts of information correspond to, for example, information entropy in a second embodiment described later.

Next, step S170 will be specifically described. The waveform determining section 443 enables the actual-measurement executing section 442 to measure the ejection characteristics when the waveform candidate is used for the driving pulse PD.

Next, step S190 will be specifically described. The evaluation in step S190 is performed by using the same evaluation function f(x) as that used for the evaluation in step S150. Note that, in step S190, Vm(x) indicates a measurement value of the ejection velocity obtained by the actual measurement, and Iw(x) indicates a measurement value of the amount of the ink obtained by the actual measurement. In addition, the waveform candidate is adjusted such that the measurement result becomes close to the target ejection characteristics in accordance with the evaluation value of the evaluation function. The adjustment is performed similarly to step S150. The adjustment is actually reflected in the waveform candidate when it is determined in step S200 described later that the procedure returns to step S120.

Next, step S200 will be specifically described. The waveform determining section 443 determines whether or not the measurement result obtained in step S180 is within a predetermined range of the target value. When the measurement result is out of the predetermined range of the target value, the procedure returns to step S120 described above. On the other hand, when the measurement result is within the predetermined range of the target value, the waveform determining section 443 determines, as the driving pulse PD waveform, the waveform candidate that is finally set, and the procedure ends.

As described above, the driving waveform determining system 100 includes the liquid ejecting head 210 and the processing circuit 270. As described above, the liquid ejecting head 210 includes the piezoelectric element 211, which is an example of the driving element for ejecting the ink which is an example of the liquid. The processing circuit 270 performs processing of determining the waveform of the driving pulse PD applied to the piezoelectric element 211.

As described above, the processing circuit 270 performs the first step of measuring, by performing the simulation, the ejection characteristics of the ink ejected from the liquid ejecting head 210 when the waveform candidate is used for the driving pulse PD, the second step of measuring, by performing the actual measurement, the ejection characteristics of the ink ejected from the liquid ejecting head 210 when the waveform candidate is used for the driving pulse PD, and the third step of determining the driving pulse PD waveform in accordance with the measurement result obtained in the first step and the measurement result obtained in the second step. In this manner, the processing circuit 270 performs the driving waveform determining method including the first step, the second step, and the third step.

According to the driving waveform determining method described above, since simulation and actual measurement are performed in combination to determine the driving pulse waveform, it is possible to obtain advantages of both simulation and actual measurement. That is, by selectively using simulation and actual measurement as appropriate so as to complement a disadvantage of one of simulation and actual measurement by using an advantage of the other, it is possible to obtain a sufficiently accurate waveform as the driving pulse waveform while reducing a burden of time and cost.

In the present embodiment, as described above, after the first waveform candidate is set, first, measurement with the simulation is performed in the first step, whether the measurement result is affirmative or negative is determined, the first step is repeated until it is determined that the determination result is affirmative, and the actual measurement is then performed in the second step. Thus, the driving waveform determining method of the present embodiment includes, in addition to the first to third steps described above, a seventh step of determining whether the measurement result obtained in the first step is affirmative or negative, and when the determination result obtained in the seventh step is affirmative, the second step is performed, and when the determination result obtained in the seventh step is negative, the first step is performed again. Accordingly, it is possible to preferentially perform the simulation and perform the simulation a sufficient number of times, thus making it possible to enhance the effect of reducing a burden of time and cost.

In the seventh step of the present embodiment, as described above, whether the measurement result obtained in the first step is affirmative or negative is determined based on criteria that whether ejection is able to be normally performed and that whether it is worth performing the actual measurement. In this manner, in the seventh step of the present embodiment, whether the measurement result obtained in the first step is affirmative or negative is automatically determined in accordance with the measurement result obtained in the first step and the predetermined condition stored in advance. This is highly convenient for the user compared with a case of manually performing the determination.

Note that steps S130, S170, S200, and S160 in the first embodiment are respectively examples of "first step", "second step", "third step", and "seventh step".

2. Second Embodiment

Figure 5:
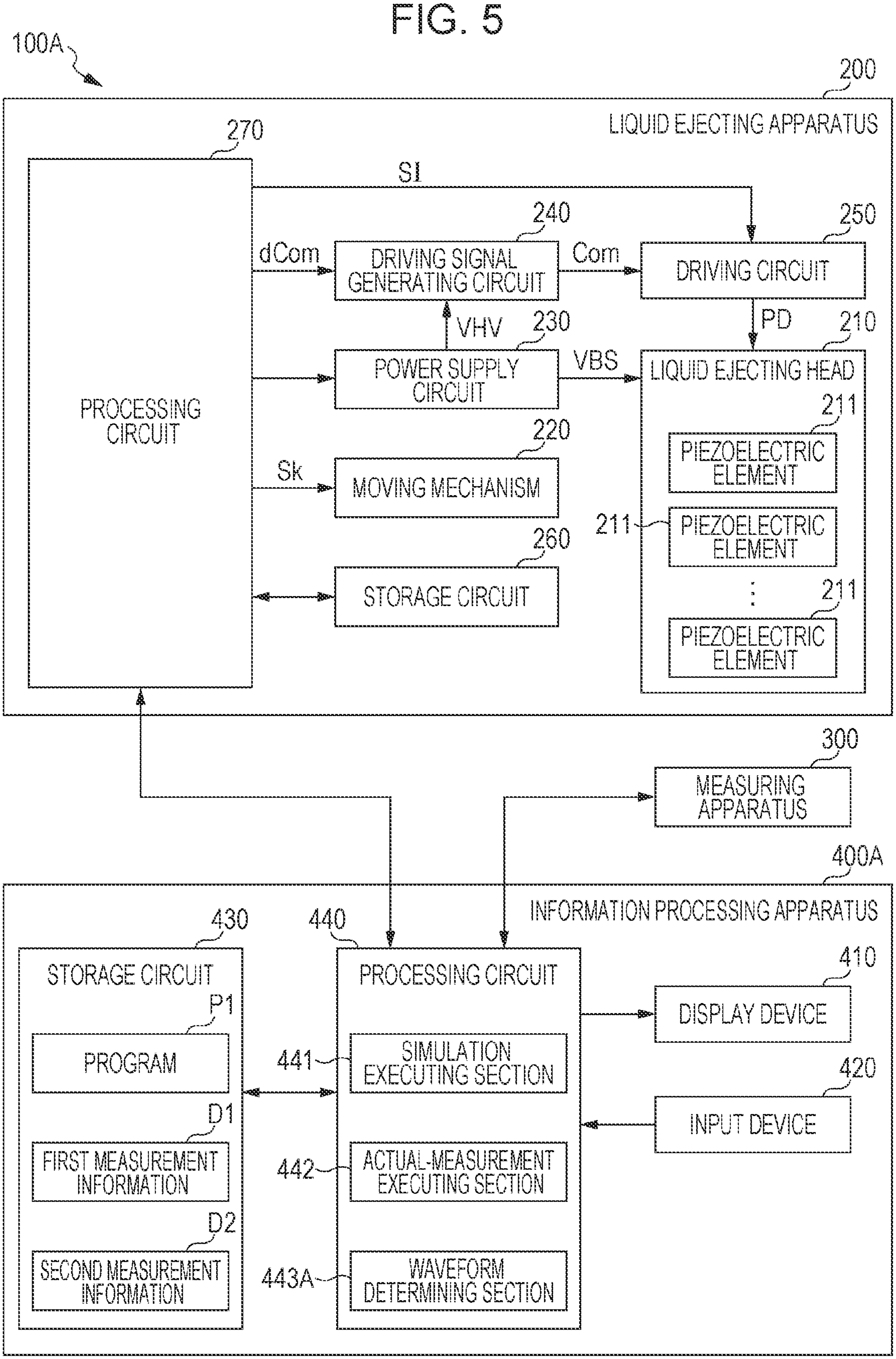
FIG. 5 is a schematic view illustrating an example of a configuration of a driving waveform determining system according to a second embodiment.

FIG. 5 is a schematic view illustrating an example of a configuration of a driving waveform determining system 100A according to the second embodiment. The driving waveform determining system 100A is similar to the driving waveform determining system 100 of the first embodiment described above except that the driving waveform determining system 100A includes an information processing apparatus 400A instead of the information processing apparatus 400. The information processing apparatus 400A is similar to the information processing apparatus 400 of the first embodiment described above except that the information processing apparatus 400A uses a program P1 instead of the program P.

The program P1, the first measurement information D1, and the second measurement information D2 are stored in the storage circuit 430 of the present embodiment. The processing circuit 440 of the present embodiment is an example of the computer and functions as the simulation executing section 441, the actual-measurement executing section 442, and a waveform determining section 443A by executing the program P1.

The waveform determining section 443A has a function of evaluating a change in reliability of information obtained from each of the simulation executing section 441 and the actual-measurement executing section 442 and has a function of determining which processing of the simulation executing section 441 and the actual-measurement executing section 442 is to be performed in accordance with the evaluation result. According to such functions, when it is more worth performing measurement with the simulation executing section 441 than performing measurement with the actual-measurement executing section 442, the measurement with the simulation executing section 441 is able to be performed without performing the measurement with the actual-measurement executing section 442.

Specifically, the waveform determining section 443A uses a change amount of information entropy regarding information obtained by measurement with the simulation executing section 441 or the actual-measurement executing section 442 and evaluates a change in reliability of the information obtained by the measurement. The information entropy regarding the information obtained by the measurement indicates unreliability of the measurement result obtained by the measurement, and lower information entropy indicates higher accuracy of the measurement result obtained by the measurement. A greater change amount of the information entropy regarding the information obtained by the measurement indicates that unreliability of the measurement result obtained by the measurement is much reduced; that is, it is more worth performing the measurement. Note that the change amount of the information entropy indicates an information amount of Kullback-Leibler or relative entropy.

Figure 6:
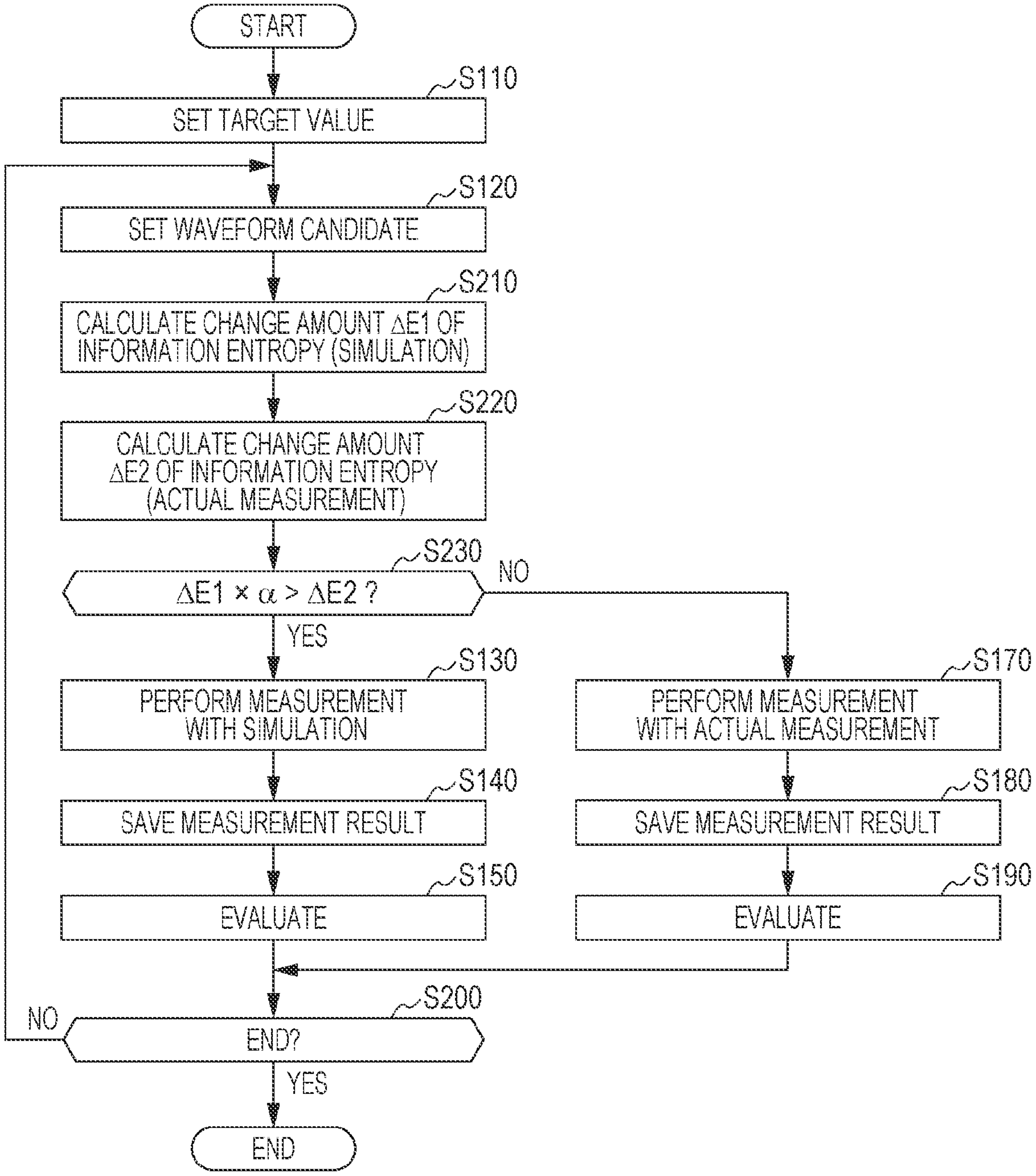
FIG. 6 is a flowchart of a driving waveform determining method according to the second embodiment.

FIG. 6 is a flowchart of a driving waveform determining method according to the second embodiment. As illustrated in FIG. 6, first, similarly to the first embodiment described above, the waveform determining section 443A sets a target value of the ejection characteristics and sets a waveform candidate according to the target value or an evaluation value in step S110 or S120. Note that the waveform candidate may be set by another method and may be generated, for example, randomly.

Next, in step S210, the waveform determining section 443A calculates a change amount ΔE1 of the information entropy of the information amount obtained by the simulation with the simulation executing section 441. In step S220, the waveform determining section 443A calculates a change amount ΔE2 of the information entropy of the information amount obtained by the actual measurement with the actual-measurement executing section 442. Note that order in which steps S210 and S220 are performed is not limited to the order indicated in FIG. 6, and step S220 may be performed between steps S120 and S220.

In step S220, the waveform determining section 443A then determines whether or not ΔE2 is less than ΔE1×α. Here, α is a coefficient for weighting and is a value more than 1. Note that the coefficient α may be set as necessary and may be 1 or less depending on accuracy of the simulation with the simulation executing section 441. However, since the ink is consumed in the actual measurement, α is desirably more than 1 such that the simulation is more easily performed than the actual measurement as much as possible.

When ΔE2 is less than ΔE1×α, the waveform determining section 443A sequentially performs steps S130 to S150 similar to those in the first embodiment described above and then performs step S200 similar to that in the first embodiment described above. That is, when valuableness obtained by performing the actual measurement is less than a times of valuableness obtained by performing the simulation, the simulation is performed.

On the other hand, when ΔE2 is more than or equal to ΔE1×α, the waveform determining section 443A sequentially performs steps S170 to S190 similar to those in the first embodiment described above and then performs step S200 similar to that in the first embodiment described above. That is, when valuableness obtained by performing the actual measurement is more than or equal to a times of valuableness obtained by performing the simulation, the actual measurement is performed.

Similarly to the first embodiment described above, also in the foregoing second embodiment, it is possible to determine the driving pulse PD waveform while reducing a burden of time and cost on the user. The driving waveform determining method of the present embodiment includes a fourth step of evaluating a change in reliability of information obtained by the simulation with the simulation executing section 441, a fifth step of evaluating a change in reliability of information obtained by the actual measurement with the actual-measurement executing section 442, and a sixth step of determining whether to perform the first step or the second step in accordance with the evaluation result obtained in the fourth step and the evaluation result obtained in the fifth step.

In the sixth step, the valuableness of the simulation or the actual measurement is able to be determined in accordance with the evaluation result obtained in the fourth step and the evaluation result obtained in the fifth step. Thus, it is possible to select and perform a more valuable step of the first step and the second step in accordance with the determination result obtained in the sixth step. The valuableness indicates successfulness of the simulation.

According to the fourth to sixth steps, when the simulation is successful as a result of determining successfulness of the simulation, the simulation is able to be performed with the first step, and, on the other hand, when the simulation is not successful, the actual measurement is able to be performed with the second step. That is, when the simulation is successful, by performing the simulation as many times as possible, it is possible to reduce a burden of time and cost, and by performing the actual measurement sequentially, it is possible to obtain a sufficiently accurate waveform as the driving pulse PD waveform.

Here, as described above, in the fourth step, by using the change amount of the information entropy regarding information obtained by the simulation, a change in reliability of the information obtained by the simulation is evaluated. In the fifth step, by using the change amount of the information entropy regarding information obtained by the actual measurement, a change in reliability of the information obtained by the actual measurement is evaluated.

The information entropy regarding the information obtained by the simulation indicates unreliability of the measurement result obtained by the simulation, and lower information entropy indicates higher accuracy of the measurement result obtained by the simulation. The change amount of the information entropy regarding the information obtained by the simulation indicates an expected value of the measurement result obtained by the simulation, and a greater change amount indicates that accuracy of the measurement result obtained by the simulation is highly expected to be enhanced and that it is more worth performing the simulation.

Similarly, the information entropy regarding the information obtained by the actual measurement indicates unreliability of the measurement result obtained by the actual measurement, and lower information entropy indicates higher accuracy of the measurement result obtained by the actual measurement. A greater change amount of the information entropy regarding the information obtained by the actual measurement indicates that unreliability of the measurement result obtained by the actual measurement is much reduced; that is, it is more worth performing the actual measurement.

Such a sixth step is desirably performed multiple times. That is, it is desirable that the third step be performed after processing of performing the first step or the second step in accordance with the determination result obtained in the sixth step is performed multiple times. In such a case, there is an advantage in that accuracy of a waveform that is determined is easily efficiently enhanced compared with a case in which the processing is not performed in such a manner.

Moreover, in the sixth step, at least one of the evaluation result obtained in the fourth step and the evaluation result obtained in the fifth step is subjected to weighting such that the number of times of performing the first step is more than the number of times of performing the second step, and whether to perform the first step or the second step is determined. Thus, it is possible to improve the effect of reducing a burden of time and cost by performing the simulation as many times as possible.

Note that steps S130, S170, S200, S210, S220, and S230 in the second embodiment are respectively examples of "first step", "second step", "third step", "fourth step", "fifth step", and "sixth step".

3. Third Embodiment

Figure 7:
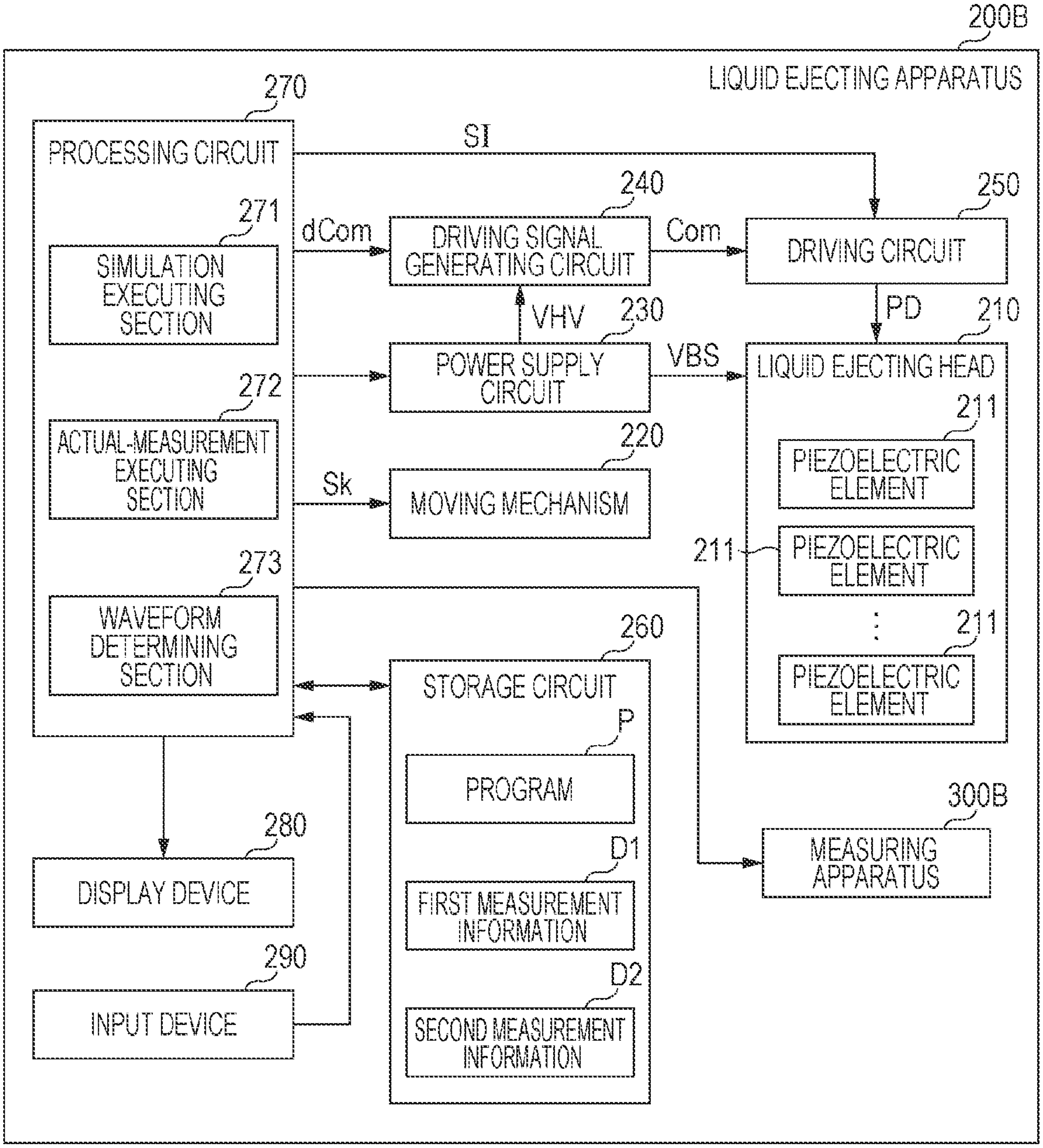
FIG. 7. is a schematic view illustrating an example of a configuration of a liquid ejecting apparatus according to a third embodiment.

FIG. 7 is a schematic view illustrating an example of a configuration of a liquid ejecting apparatus 200B according to a third embodiment. The liquid ejecting apparatus 200B is similar to the liquid ejecting apparatus 200 described above except that the liquid ejecting apparatus 200B includes a display device 280, an input device 290, and a measuring apparatus 300B and executes the program P.

The display device 280 is similar in configuration to the display device 410 of the first embodiment described above. The input device 290 is similar in configuration to the input device 420 of the first embodiment described above. The measuring apparatus 300B is similar in configuration to the measuring apparatus 300 of the first embodiment described above. Note that at least one of the display device 280, the input device 290, and the measuring apparatus 300B may be provided outside the liquid ejecting apparatus 200B.

The program P, the first measurement information D1, and the second measurement information D2 are stored in the storage circuit 260 of the present embodiment. The processing circuit 270 of the present embodiment is an example of the computer and functions as a simulation executing section 271, an actual-measurement executing section 272, and a waveform determining section 273 by executing the program P.

Similarly to the simulation executing section 441 of the first embodiment described above, the simulation executing section 271 performs measurement by performing a simulation. Similarly to the actual-measurement executing section 442 of the first embodiment described above, the actual-measurement executing section 272 performs measurement by performing an actual measurement. Similarly to the waveform determining section 443 of the first embodiment described above, the waveform determining section 273 determines a waveform of the driving pulse PD. As described above, similarly to the processing circuit 440 of the first embodiment described above, the processing circuit 270 performs the first step, the second step, and the third step.

Similarly to the first embodiment described above, also in the foregoing third embodiment, it is possible to determine the driving pulse PD waveform while reducing a burden of time and cost on the user. Note that, also in the present embodiment, the program P1 of the second embodiment described above may be used instead of the program P.

3. Modified Example

The driving waveform determining method, the non-transitory computer-readable storage medium storing the driving waveform determining program, the liquid ejecting apparatus, and the driving waveform determining system according to the disclosure have been described above based on the illustrated embodiments. However, the disclosure is not limited thereto. Additionally, the configuration of each of the sections of the disclosure may be replaced with any configuration that exerts a similar function of the aforementioned embodiments, and any configuration may be added thereto.

3-1. Modified Example 1

The configuration in which the program P is executed by the processing circuit provided in the same apparatus as the storage circuit in which the program P is installed is exemplified in the aforementioned embodiments, but the configuration is not limited thereto, and the program P may be executed by a processing circuit provided in an apparatus different from the storage circuit in which the program P is installed. For example, as in the first embodiment, the program P stored in the storage circuit 430 of the information processing apparatus 400 may be executed by the processing circuit 270 of the liquid ejecting apparatus 200.

What is claimed is:

1. A driving waveform determining method with which a waveform of a driving pulse applied to a driving element provided in a liquid ejecting head that ejects a liquid is determined, the driving waveform determining method comprising:

a first step of measuring, by performing a simulation, ejection characteristics of the liquid from the liquid ejecting head when a waveform candidate is used for the driving pulse;

a second step of measuring, by performing an actual measurement, the ejection characteristics of the liquid from the liquid ejecting head when the waveform candidate is used for the driving pulse;

a third step of determining the waveform of the driving pulse in accordance with a measurement result obtained in the first step and a measurement result obtained in the second step;

a fourth step of evaluating a change in reliability of information obtained by the simulation;

a fifth step of evaluating a change in reliability of information obtained by the actual measurement; and a sixth step of determining whether to perform the first step or the second step in accordance with an evaluation result obtained in the fourth step and an evaluation result obtained in the fifth step.

2. The driving waveform determining method according to claim 1, wherein in the fourth step, the change in reliability of the information obtained by the simulation is evaluated by using a change amount of information entropy regarding the information obtained by the simulation, and in the fifth step, the change in reliability of the information obtained by the actual measurement is evaluated by using a change amount of information entropy regarding the information obtained by the actual measurement.

3. The driving waveform determining method according to claim 1, wherein after processing of performing the first step or the second step in accordance with a determination result obtained in the sixth step is performed multiple times, the third step is performed.

4. The driving waveform determining method according to claim 3, wherein in the sixth step, at least one of the evaluation result obtained in the fourth step and the evaluation result obtained in the fifth step is subjected to weighting such that the number of times of performing the first step is more than the number of times of performing the second step, and whether to perform the first step or the second step is determined.

5. The driving waveform determining method according to claim 1, further comprising:

a seventh step of determining whether the measurement result obtained in the first step is affirmative or negative, wherein when a determination result obtained in the seventh step is affirmative, the second step is performed.

6. The driving waveform determining method according to claim 5, wherein when the determination result obtained in the seventh step is negative, the first step is performed again.

7. The driving waveform determining method according to claim 5, wherein in the seventh step, whether the measurement result obtained in the first step is affirmative or negative is automatically determined in accordance with the measurement result obtained in the first step and a predetermined condition stored in advance.

8. A non-transitory computer-readable storage medium storing a driving waveform determining program, the driving waveform determining program causing a computer to execute the driving waveform determining method according to claim 1.

9. A liquid ejecting apparatus comprising:

a liquid ejecting head that has a driving element for ejecting a liquid; and a processing circuit that performs processing of determining a waveform of a driving pulse applied to the driving element, wherein the processing circuit performs a first step of measuring, by performing a simulation, ejection characteristics of the liquid from the liquid ejecting head when a waveform candidate is used for the driving pulse;

a second step of measuring, by performing an actual measurement, the ejection characteristics of the liquid from the liquid ejecting head when the waveform candidate is used for the driving pulse;

a third step of determining the waveform of the driving pulse in accordance with a measurement result obtained in the first step and a measurement result obtained in the second step;

a fourth step of evaluating a change in reliability of information obtained by the simulation;

a fifth step of evaluating a change in reliability of information obtained by the actual measurement; and a sixth step of determining whether to perform the first step or the second step in accordance with an evaluation result obtained in the fourth step and an evaluation result obtained in the fifth step.

10. A driving waveform determining system comprising:

a liquid ejecting head that has a driving element for ejecting a liquid; and a processing circuit that performs processing of determining a waveform of a driving pulse applied to the driving element, wherein the processing circuit performs a first step of measuring, by performing a simulation, ejection characteristics of the liquid from the liquid ejecting head when a waveform candidate is used for the driving pulse;

a second step of measuring, by performing an actual measurement, the ejection characteristics of the liquid from the liquid ejecting head when the waveform candidate is used for the driving pulse;

a third step of determining the waveform of the driving pulse in accordance with a measurement result obtained in the first step and a measurement result obtained in the second step;

a fourth step of evaluating a change in reliability of information obtained by the actual measurement;

a fifth step of evaluating a change in reliability of information obtained by the simulation; and a sixth step of determining whether to perform the first step or the second step in accordance with an evaluation result obtained in the fourth step and an evaluation result obtained in the fifth step.

* * * * *